July 15, 1941.  A. J. HANLEY  2,249,275
INSULATING MATERIAL AND METHOD OF MANUFACTURE
Filed March 31, 1937
Fig. 3. SURFACE-SIZED WADDING STILL POROUS
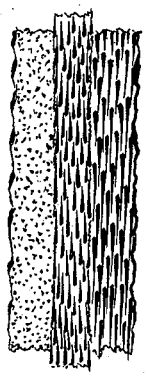
Fig. 4. CONSOLIDATED STRETCHABLE PLASTIC SHEET WITH STABLE INSULATING RESIN SURROUNDING INDIVIDUAL FIBERS.
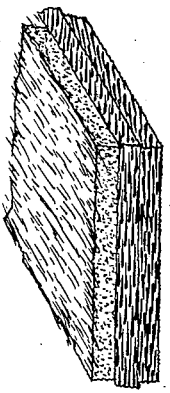
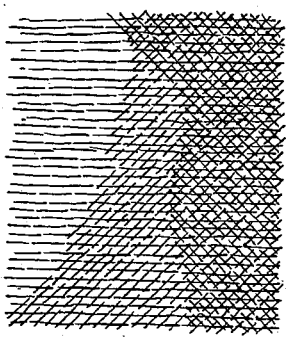
OPEN FLUFFY WADDING OF DIFFERENTLY LAID BATS OF ASBESTOS FIBERS OR LIKE.
Fig. 1.
Fig. 2.
INVENTOR.
BY Albert J. Hanley
Philip S. McLean
ATTORNEY.

Patented July 15, 1941

2,249,275

UNITED STATES PATENT OFFICE 2,249,275

INSULATING MATERIAL AND METHOD OF MANUFACTURE

Albert J. Hanley, Cranston, R. I., assignor to Respro Inc., Cranston, R. I., a corporation of Rhode Island Application March 31, 1937, Serial No. 134,033

2 Claims. (Cl. 154—2.6)

The invention here disclosed relates to materials useful for insulating and other purposes.

Special objects of the invention are to provide an insulating material in sheet form, which will be strong, flexible, moisture-resisting, oil-resisting, flame-resisting, heat-healing, plastic, non-raveling and in other ways, particularly suited for wrapping electric cables and conductors.

Other important objects are to accomplish the commercial production of such material by practical economical methods, which can be readily carried out with more or less standard equipment.

In the attainment of the foregoing and other desirable objects, the invention comprises in general a base in the form of a wadding of asbestos fiber, glass fiber or the like, saturated with a flexible flame-resisting, moisture-resisting adhesive and the methods by which such material is produced.

This wadding when saturated with adhesive and consolidated, presents a structure in which loose or unbound fibers are suspended in a thermoplastic medium, so that the entire mass will yield or flow under heat, or pressure, or heat and pressure. These properties are especially desirable for insulating tape, giving it the desired strength for winding purposes and enabling it to spread evenly under heat and pressure to close spaces between successive turns and between adjoining laps of the material. This spreading ability is not present in asbestos cloth and paper constructions. While asbestos braid may spread, such spreading can only result in an uneven distribution of the materials, because such spreading is a result of the separation of the threads forming the braid. Furthermore, the width of such tape will vary with the longitudinal tension employed in winding it in place, leaving spaces between the edges of adjoining convolutions, where variations in tension have occurred.

Asbestos coverings have been applied heretofore in various ways, such as by weaving an asbestos braid and taping with such braid, or weaving a cloth from asbestos threads and cutting such cloth in narrow widths and using same for taping purposes. Asbestos paper has been cut in strips and used as a tape and the roving of asbestos upon a conductor has also been practiced.

It has been common to saturate such asbestos coverings of fabric, paper or threads with materials possessing certain electrical, water resisting or flame-resisting characteristics. The difficulties of saturating such a covering on a conductor have been considerable. These coverings have been used particularly on power cables and it is extremely difficult and in many cases practically impossible to pass such heavy and relatively inflexible conductors through a saturating bath and necessary pressing and drying operations and accomplish full uniform saturation. Under heat of the adhesive and the pressure to squeeze it in more or less uniformly, the asbestos and even underlying parts of the cable may be deformed. Successive layers of asbestos in being treated with additional adhesive will deform the layers beneath and the adhesive in being raised again above its softening point will run to the lower part of the cable, so that distribution of adhesive is not uniform. Also the presence of ingredients in or on the conductor that might be reactive with the saturant or necessary solvents used in effecting the saturation have restricted the type of adhesive that could be used for saturating such coverings on the conductor.

In the cases where asbestos has been impregnated before application to the conductor, the physical condition of the asbestos has practically precluded uniform saturation. With braids or woven fabric, the asbestos being in the form of thread creates the characteristic non-uniformity of any cloth with alternate spaces and threads and cross weaving. Thread is difficult to saturate uniformly and practically impossible to saturate copiously throughout. Such saturation becomes progressively more difficult as the twist of the yarn is greater and this twist is necessary to the strength of such thread. In such threads, of high twist and imperfectly saturated cores, the fibers are in close physical contact. The capillary action through the cores of the threads have very great attraction for fluid materials, such as water. With these highly developed wick-like properties, it frequently results that where a thread becomes exposed, it will pick up water and carry it along through an extended distance, ever seeking weak points, resulting in failures at remote places from the locality of original exposure.

The saturation of water-laid asbestos paper is difficult and at best, the paper will absorb only limited quantities of saturant. Asbestos roving may be loose enough to take up a sufficient quantity of saturant, but such saturation is difficult to accomplish because of the weakness and disintegrating tendency of the material.

Difficulties, faults and limitations such as mentioned are avoided, overcome and eliminated in the present invention, as will appear.

In a particular and at present preferred embodiment of the invention, an asbestos wadding is produced by carding asbestos of so-called "spinning length" fiber on a card or Garnett machine to provide bats that are open and fluffy, readily absorbent of and penetrable by saturants of diverse physical and chemical properties. A number of these bats may be combined, depending upon the ultimate weight of wadding or lap required. Where the weight of the ultimate bat is to be heavier than the wadding produced from a single Garnett machine, it is customary to arrange a series of garnetts straddled above a carrier apron, so that the combined waddings of each machine are laid upon each other. Where a tape of the greatest longitudinal strength is required, such machines will lay their waddings so that the fibers will all lie in the longitudinal direction of the tape. In other instances, where transverse strength is required, such strength may be produced by arranging one or more garnetts to the side of the belt and an apron to lay such waddings from these side machines back and forth across the longitudinal waddings.

While the entire fibrous content may be of an inorganic or mineral nature, such as asbestos or glass, other fiber may be included, such as the non-inflammable artificial fibers produced by extruding synthetic plastic chemicals of low flammable nature, or small proportions of cotton, hair, or other organic fiber.

In the example under consideration, approximately 15% long cotton fiber is included for supporting and interlacing with asbestos fibers.

To give the wadding strength for the necessary handling, it may be and usually is sized on one or both sides. Thus in the example under consideration, after the batting has acquired the desired weight of fibers, the wadding is sized with a water-resisting and flame-resisting adhesive, which will secure the surface fibers together without filling up the interstices. This may be accomplished by passing the wadding through one set of sizing rolls, applying water-resisting and flame-resisting adhesive to one face of the material and then after drying, similarly applying sizing to the opposite face and drying. The sized bat of wadding then has sufficient strength for such manipulation as required for the one or more saturating operations. While this sizing is a desirable and practical way of putting the wadding in form for handling, storing, packing or transporting, it is not an essential step in the process and in some cases, may be omitted and the wadding be saturated directly, for instance, immediately following its formation.

Various adhesives may be employed as the saturant. Usually such adhesive should be flexible, flame-resisting, moisture-resisting, oil-resisting, cohesive, plastic and moldable either at room temperature or under heat and pressure. Also it should have high dielectric value, low power factor and be electrically resistant. It should have bonding and self-healing properties, permitting consolidation. The adhesive should be of a firm nature at room temperature having a very slight cold flow. It should have the property of self-healing with increase of temperature. Its flowing properties should be such that it will be most viscous even at 100° centigrade since it should not drip from the tape at that temperature. These properties are considered as comprehended under the term plastic as used herein. While all these qualities are desirable, in some circumstances, one or more possibly may be omitted.

In general, many synthetic resins possessing the above properties are commercially available. The so-called Bakelite resins or condensation resins of the type known as phenol aldehyde resins, phenol aldehyde modified resins, and the phenol esters, especially the phosphate esters, possess characteristics desirable for present purposes. The so-called glyptal or alkyd resins or the condensation products of the polyhydric alcohol-polybasic acid resins, or the modified polyhydric alcohol-polybasic acid resins and the alkyd resin salts are desirable as adhesives. The chlorinated naphthalenes may be used or chlorinated products may be used for producing the modified forms of the above resins. The adhesive need not of necessity be entirely of one type of resin, but may be a blend of resins such as the above. The resin or resins may be properly plasticized to the most desirable flexibility or softness by the incorporation of suitable plasticizers. The synthetic resins used may be in a state of low polymerization or fully polymerized, or at any intermediate state. The state of polymerization may be unstable, so as to develop later either in processing or in use, or it may be fixed or stabilized.

The method of bringing the wadding and adhesive together, that is, the saturating will depend to an extent upon the physical properties of the saturant. Some adhesives are of sufficiently low melting point or low softening point to become fluid without altering any of their desirable chemical properties. Under such conditions, the adhesive may simply be heated to a temperature above such melting point, allowed to permeate the wadding and the surplus be removed by passing the saturated wadding between a pair of rolls. If on melting, the material does not become sufficiently fluid to seep into the wadding and saturate it thoroughly, the roll may be utilized to force the saturant into the wadding by the hydrostatic head created by the adhesive laden wadding entering the bite of the rolls.

The physical properties of the adhesive or convenience of operation may require that the adhesive be treated with or be dissolved in solvents which will convert it from a solid or semi-solid into a liquid of sufficiently low body to readily penetrate and saturate the wadding. The softening point of the adhesive is often an important factor in the finished product. There is at present, a demand for adhesives of higher softening point and which at the softening point will not readily flow. For such adhesives, solvents are usually required to obtain sufficiently low fluidity for full saturation of the web.

The loosely laid fiber of the wadding has a highly developed capillary action, enabling it to uniformly retain the introduced adhesive and preventing dripping of the adhesive, even when the softening point has been exceeded. Cables insulated with this material therefore will stand a higher "drip test" than previous insulations employing the same adhesive.

Various methods of applying the adhesive may be employed. The operation may be a simple dipping of the material in a molten bath, or dipping in a solution of the adhesive, either hot or cold, and thereafter passing between rolls to remove surplus, or both to remove surplus and assist in penetration.

In the present example, using a modified Bakelite solution or halowax compound solution as the saturant, the application is effected by supplying a hot solution of the adhesive to the surface of the wadding approaching the bite of cooperating heated rolls. In the case of the Bakelite solution, which is relatively thin and penetrates freely, the rolls act to even the saturation and to hold back and remove excess material. The hot halowax compound solution on the other hand, may be relatively stiff and "nervy" and the rolls then serve as a pressure means for forcing the saturant into the wadding. In either case, heat may be employed to reduce the consistency of the solution. Many solutions may be reduced in viscosity by heat and there may therefore be advantage in using heat instead of more solvent.

The next step in the operations is to firm the adhesive and the character of such step will depend on the condition of the adhesive. If the adhesive has been applied in a hot molten condition, the succeeding step will be one of cooling. If applied in a solvent form, the succeeding act will be to remove the solvent. Thus in the case of the Bakelite saturant, the treated webbing will be passed through a drying chamber to evaporate and remove solvent. In the case of some hot saturants, free of solvents, the treated web may be passed through a cooling chamber or simply over a cooling drum. In all cases, a solidifying and partial hardening is effected. By these operations, the individual fibers of the wadding are surrounded by a generous film of adhesive and the voids between filled with a considerable surplus of adhesive. If necessary, these operations are repeated a number of times, passing the wadding through the bath until by repeated inpregnation and solidifying, the fibers become sufficiently laden with the plastic adhesive. Because of its open structure, the wadding is receptive to and retentive of much larger quantities of adhesive than can be taken up or retained by other types of textiles.

When a proper relationship between fiber and adhesive is attained, the mass is pressed and consolidated into a compact sheet. This pressure step may be effected by passage of the product between rolls or in plate presses and such pressing may be either cold or with heat. The amount of consolidation will be governed to an extent by the amount of trapped air or gases present. When saturation has been accomplished with little or no entrainment of air or gases, this consolidation step may become simply one of smoothing and calendering the surfaces.

The impregnated consolidated sheet material may be further processed by application of a coat of the same or of a different adhesive to one or to both surfaces. This adhesive coating may be applied by means of a three or more roll calender, such as used for rubber calendering work. This calender sheets a thin uniform film of adhesive from a bank between two of the rolls and this film is carried by one of said rolls to the surface of the material which is passing in with and usually supported by another roll against the sheeted film, whereby such film is pressed firmly against and becomes anchored to the surface of the sheet. This calendering coating utilizes the thermoplasticity of the adhesive in that the rolls are kept warm and the film applied to the sheet is made to adhere firmly to it on subsequent cooling. Such subsequent cooling, firms the coating so that the sheet material and tape cut from it can be readily handled and worked without softness or tackiness. As an alternative the surface coating may be applied as a knife coating of a solution of the coating adhesive. In such instance the evaporation of the solvent regenerates the adhesive.

The surface coating may be of the same general composition as the sizing and saturating adhesives previously used. However the sizing, the saturating and the coating adhesives may be of three different classes or compositions or any two may be of the same nature and the third be of a different nature.

All the operations described have the effect of strengthening the material, while preserving its plasticity and moldability, bringing it to a state where it is strong enough for insulating tape purposes, or for use in full width sheets. If it is to be used for tape, the material, which after calendering will usually have been wound in a roll, may be put through a slitting machine and cut in any desired widths, from a fraction of an inch up to several inches, to suit requirements. If it is to be used in panels or special shapes, it may be punched or cut as required.

To prevent the material from sticking when wound in rolls, it may be dusted with mica or the like, following the calender coating or in the calendering operations described. The tape however is usually left slightly "tacky," so that it will adhere sufficiently in the act of application. In wrapping cables, it is the general practice to apply more than one winding, three to five layers being usual. The tape of this invention is particularly effective for such use, in that under heat and pressure the structure will consolidate, the convolutions and layers annealing and healing together in one homogeneous mass with all portions of the cable covering of substantially equal physical and electrical characteristics. The adjacent turns knit together, so that the first layer becomes a continuous sheath firmly united to the foundation and with subsequent layers amalgamated to the first.

The operations of opening, refining, blending and lapping the wadding of asbestos or glass, or the like, may be effected on Garnett machines and the other operations may be carried out with existing equipment or machines readily modified to meet the special conditions of the invention. The wadding is built up and kept open to take the full amount of saturant. In the case of a thermoplastic such as Bakelite, a cooling stage may be desirable after the passage through the drier for removing the solvent. Before rolling, the sheet material may be run around a cooling drum.

After applying the insulating tape to cables, the usual practice is to wind on a metallic armor. The pressure and heat of armoring the cable in this way is sufficient to mold this thermoplastic material to fill in all spaces and leave no voids.

The open textile structure of the asbestos wadding enables the asbestos fibers to exert the greatest capillary action and literally soak up a maximum adhesive content, thereby becoming thoroughly filled with and embedded in adhesive. This thus eliminates any hygroscopic effect and provides a desirably high drip test. While the calendering is desirable for the compacting effect, this may not be necessary as a final step, if the final saturating step is sufficient in its smoothing effects.

In the drawing accompanying and forming part of this specification, the several steps of the process are represented diagrammatically. Fig. 1 being a broken plan and Fig. 2 a cross-sectional diagrammatic view illustrating the overlaying of the open fluffy bats in different directions to form a loose open fluffy wadding; Fig. 3 illustrating the surface sizing with the water and flame resisting adhesive, but leaving the wadding with open interstices, and Fig. 4 illustrating the impregnating of the still open fluffy wadding with copious quantities of stable plastic resin to surround the individual fibers, and consolidation into the plastic stretchable sheet.

The operations may be carried out as parts of a more or less continuous process. The structure of the tape gives it transverse extensibility, enabling it to spread, to an extent to fit the particular needs for molding and shaping it in place. While the adhesive preferably is thermoplastic in the preliminary stages and up to and including the armor covering stage, it may afterward be converted into a non-thermoplastic state. Thus for example, to obtain a still higher drip test, the adhesive may be thermoplastic up to a time when the material on the conductor is heated for a longer period than that required in the short heat process of saturation and then become thermo-reactive so as to cure into a state of lesser or in fact, no drip possibilities. For some uses it may be desirable to cure it in the sheet form, before application to the cable or other use. For average uses however, the adhesive may be of a lasting or of a permanently plastic nature.

What is claimed is:

1. The herein disclosed method of producing electric insulating material in a plastic flat sheet form and which can be wrapped, molded, stretched and formed about electric conductors or other objects and which comprises carding open fluffy bats of loose asbestos fibers, overlaying a number of such open fluffy bats in different directions into a loose open fluffy wadding, surface sizing said open wadding with a water and flame resisting adhesive, sufficiently only for holding the loose surface fibers together for subsequent handling and without filling the interstices in the open wadding, introducing synthetic insulating resin of a stable thermoplastic type into and through said open fluffy wadding and entirely around and about the loose individual fibers of said open wadding with sufficient of said resin to form a plastic sheet in which said loosely related fibers are freely suspended, and consolidating the same into a firm plastic, stretchable and moldable body in plastic sheet form.

2. The herein disclosed method of manufacturing electric insulating material in plastic flat sheet form, which can be wrapped, stretched and molded about electric conductors and other objects and which comprises forming a loose open wadding of asbestos fibers, introducing copious quantities of stable plastic synthetic resin into and through said loose open wadding and completely surrounding the loose individual fibers of said open wadding in quantities floating said individual fibers in separately suspended relation and consolidating said individual fiber reinforced sheet of plastic insulating medium into firm plastic sheet form, stretchable and extensible to conform to various contours.

ALBERT J. HANLEY.